(12) United States Patent
Coleman et al.

(10) Patent No.: US 7,708,400 B2
(45) Date of Patent: May 4, 2010

(54) PROTECTIVE TEMPLE COVERING

(76) Inventors: Marilyn Lee Coleman, 14 Oak La., Green Pond, NJ (US) 07435; William James Coleman, 14 Oak La., Green Pond, NJ (US) 07435

(*) Notice: Subject to any disclaimer, the term of this patent is extended or adjusted under 35 U.S.C. 154(b) by 0 days.

(21) Appl. No.: 12/244,072

(22) Filed: Oct. 2, 2008

(65) Prior Publication Data
US 2009/0027613 A1    Jan. 29, 2009

Related U.S. Application Data

(63) Continuation of application No. 11/147,608, filed on Jun. 8, 2005, now abandoned.

(51) Int. Cl.
*G02C 5/14*    (2006.01)
(52) U.S. Cl. ..................................... 351/122
(58) Field of Classification Search .................. 351/41, 351/111, 122, 123, 158
See application file for complete search history.

(56) References Cited

U.S. PATENT DOCUMENTS 5,583,585 A * 12/1996 Sternberg et al. ............ 351/122
6,270,217 B1 * 8/2001 Lizzi ........................... 351/122
2005/0129885 A1 * 6/2005 Mize ........................... 428/35.2

* cited by examiner

*Primary Examiner*—Huy K Mai
(74) *Attorney, Agent, or Firm*—Gearhart Law, LLC

(57) ABSTRACT

Disclosed are systems and methods for manufacturing sleeves, a sleeve dispenser, and a method of manufacturing inexpensive, throwaway sleeves that may be used to protect temples from chemicals, germs, bacteria, and the like. Sleeves may be inexpensively manufactured using a single inexpensive raw material as well as an inexpensive manufacturing process in which no waste material is produced. Furthermore, sleeves may be produced as a compact roll of sleeves to accommodate unobtrusive placement in areas with limited space, thereby facilitating distribution in space-limited facilities such as hair salons, spas, optometrist or ophthalmologist offices, sunglass shops, and the like. In some embodiments, the sleeves include latitudinal and longitudinal perforations that facilitate removal of pairs of sleeves from the sleeve roll and removal of each of the pair of sleeves from each other. After separation, a sleeve aperture is passed over the temple until it is fully covered and protected.

1 Claim, 7 Drawing Sheets

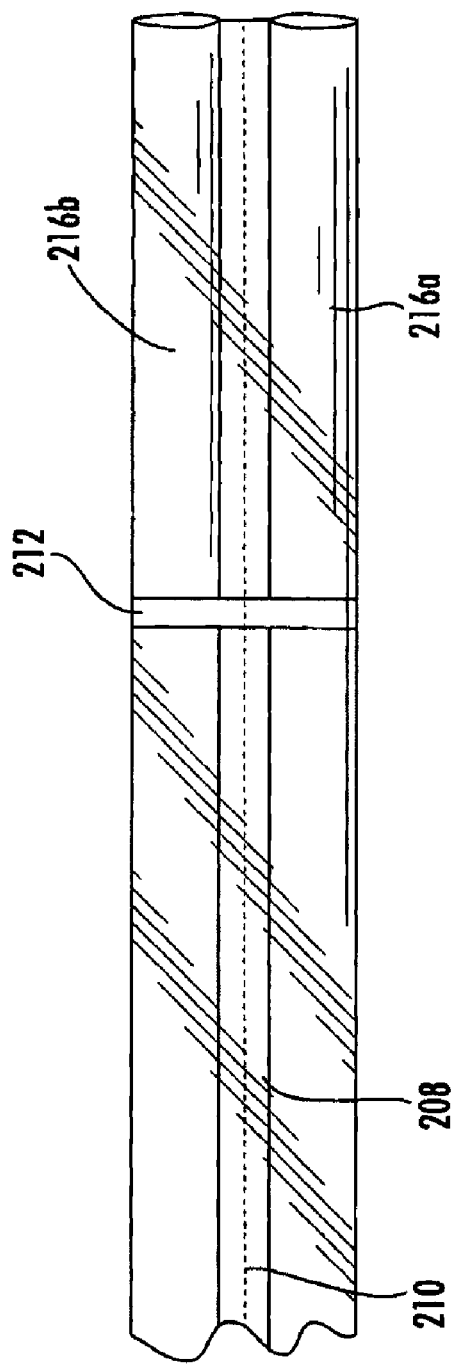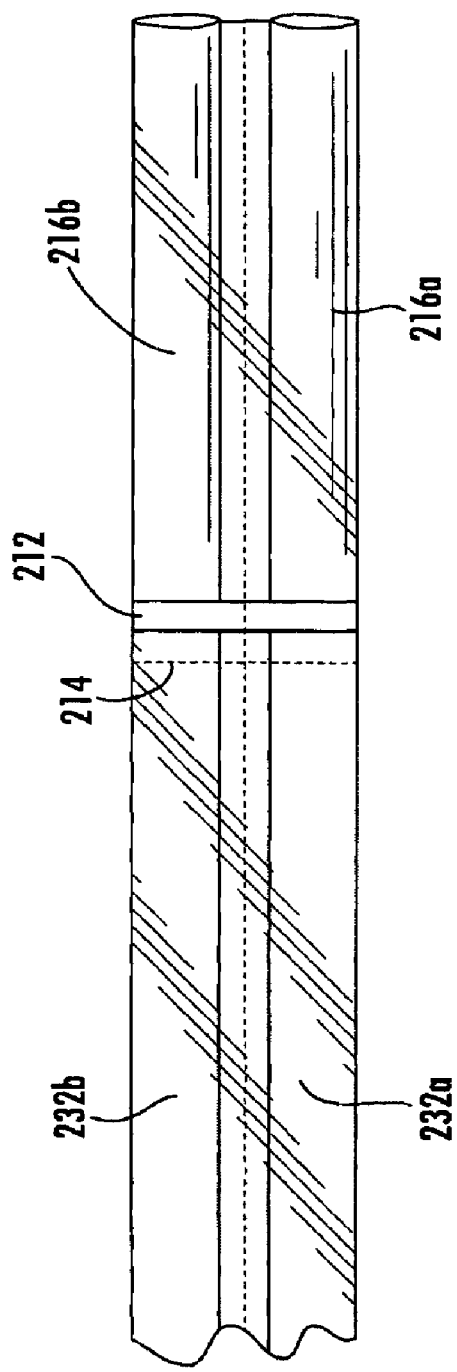

PROTECTIVE TEMPLE COVERING

CLAIM OF PRIORITY

This application claims the priority of and is a continuation of U.S. Ser. No. 11/147,608 filed on Jun. 8, 2005, which is incorporated herein by reference.

BACKGROUND OF THE INVENTION

Embodiments of the present invention generally relate to aids for efficiently and effectively protecting the temples of glasses such as eyeglasses or sunglasses. More specifically, the present invention relates to sleeves, a sleeve dispenser, and a method of manufacturing inexpensive, throwaway sleeves that may be used to protect temples from chemicals, germs, bacteria, and the like.

Many systems and methods have been created to provide additional comfort to persons requiring eyeglasses. Many such systems and methods have been designed to be permanently attached to the temples of eyeglasses. In its most simplistic form, one such system includes a lamination of the temples. This laminate creates a soft barrier between the temples and the wearer's head. In one such system, a laminate such as vinyl acetal resin is employed. The laminate is compressed and contacted against each temple rendering it a permanently component of the temple. After the laminate is applied, the temples may be bent into the shape desired by the wearer and attached to the bow of the eyeglasses.

Another similar system was created to prevent bruising to the portion of the user's head located behind the ears while simultaneously preventing the eyeglasses from changing position while they are worn. In this system, the portion of the temples that engage the user's ear when the eyeglasses are worn is formed with the same curvature as the backside of the ear. A thin rubber cap is then placed over the curved portion of the temples such that the user's head is protected from bruising that many occur with continuous wear of the eyeglasses.

Other such systems are designed to be removably attached to the temples of eyeglasses. In one system, a temple cover is made of an elastic deformable material. This temple cover has an elongated tubular shape with an inner diameter throughout the majority of the cover such that it may be slid over the portion of the temple that engages the user's ear. The cover also contains a reduced or constricted end portion that allows the cover to be held in place on the temple. The cover may be removed from the temple by applying pressure in a direction opposite to the eyeglass lenses. In another such system, the cover is extended such that it covers the straight portion of the temple as well as the curved portion for additional protection to the wearer's head.

In another similar system, a temple cover is created from a transparent plastic material. This cover also has an elongated tubular shape with a constricting inner diameter throughout the majority of the cover. However, it additionally contains a slot throughout its length. This slot allows the cover to be snapped onto the end portion of temples having varying diameters and curvatures. The cover may be removed by applying pressure in a direction such that the temple is forced through the slot.

Many systems and methods have been created to provide protection for the temples of eyeglasses. In some instances, temples may need to be protected from the environment. For example, such protection may be required when a wearer undergoes a chemical treatment to the hair, head, or face. Alternatively, temples may require protection to prevent the passage of germs or disease between multiple wearers of a single pair of eyeglasses. Furthermore, many such systems and methods have been designed to be removably attached to the temples. In their most simplistic forms, such systems include disposable temples covers.

In one such system, a temple cover is formed from a soft resilient plastic material. The cover is tubular and consists of one open end, one closed end and a longitudinal center passage having a diameter equivalent to conventional temples. The open end of the cover further consists of a constrictive plastic ring with a short portion of the tubular member rolled about the ring. The open end of the cover is passed over the temple and the constrictive action of the ring holds the cover in place.

In another such system, a sheet of plastic is folded in half such that its folded length is equivalent to the length of conventional eyeglass temples. A short segment of one half of the plastic is then folded back to form a cuff. The sheet is then sealed across the width of the plastic multiple times at equidistant locations to form multiple individual temple covers and the covers are cut along the seals to separate the temple covers. When protection is required, a user then passes the cuffed end of an individual temple cover over the temple until the entire temple is covered. Additionally, the temple covers may include markers such as colored markers to indicate the open end of the temple cover to the user.

Another similar system includes a method of dispensing eyeglass temple covers. In this system, the temple covers are formed on sheets that are rolled to create a cylindrical roll of such sheets. The sheets are perforated such that they may be easily removed from the roll. Each sheet contains two individual temple covers formed from tubular pockets contained within the sheet and having one open end and one closed end. Each temple cover is also perforated at the edges for removal from the sheet. Upon removal from the sheet, the open end of the pocket is passed over the eyeglass temple when protection is required. The remainder of the sheet is then discarded.

Similarly, another system includes temporary temple covers designed to allow temples to be molded to the shape of the wearer's head. In this system, the temple covers act as sheaths that allow the shapes of the temples to be molded to the shape of the wearer's head by facilitating the application of heat in a manner that does not cause harm to the wearer. After the temples are heated, the temple covers are placed onto the temples. The eyeglasses are then placed onto the user's head and the temples are shaped to their desired position. After the temples have cooled, the eyeglass temple covers are removed from the eyeglass temples.

SUMMARY OF THE INVENTION

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

A sleeve dispenser for dispensing inexpensive, throwaway sleeves for protection of the temples such as eyeglass or sunglass temples is provided in one aspect of the present invention. In one embodiment of the present invention, the sleeve dispenser includes, inter alia, housing and a sleeve roll.

The sleeve roll may include interconnected pairs of sleeves. In one aspect of the present invention, the sleeves are manufactured from a flexible, chemical-resistant material. For example, in one embodiment of the present invention, the sleeves are manufactured from a polymer such as polyethylene, thereby creating clear, soft, flexible, sanitary sleeves that are resistant to water, acids, alkalies, and a majority of solvents. Also, use of such a material allows the sleeves to be produced inexpensively. The inexpensive cost of the sleeves accommodates throwaway use of the sleeves, thereby facilitating distribution in facilities such as hair salons, spas, optometrist or ophthalmologist offices, sunglass shops, and private homes. To further reduce the cost of the sleeves, they may be manufactured using a process wherein a minimal quantity of steps is required and no waste material is produced. During this manufacturing process, the final sleeve product may be created in the form of a compact sleeve roll to accommodate unobtrusive placement in areas with limited space.

The sleeves may include latitudinal and longitudinal perforations that facilitate removal of pairs of sleeves from the sleeve roll and removal of each of the pair of sleeves from each other. The sleeves also include a sleeve aperture, which may be created during the manufacturing process. Upon separation from the sleeve roll and each other, the sleeves provide protection for temples, such as eyeglass or sunglass temples, by passing the sleeve aperture over the temple until it is fully covered and protected.

A simple, inexpensive method of manufacture of a roll of sleeves is provided in another aspect of the present invention. Although one method is described herein, other methods of manufacturing the sleeves of the present invention may be employed without departing from the present scope of the invention.

In the first step of the manufacturing process, a tubular material is formed or purchased. In one aspect of the present invention, the tubular material is extruded tubular polyethylene having a circular diameter. Polyethylene is an inexpensive polymer that may be extruded via methods such as the application of high temperature and pressure. The use of a moldable polymer such as polyethylene also allows the sleeves to be formed without byproducts, which eliminates waste of raw materials and reduces the expense associated with the first stage of the manufacturing process.

After the tubular material has been extruded and cooled, the manufacturing process proceeds to the second stage in which the tubular material is wound onto a reel. The winding of the tube onto the reel causes the tubular material to flatten and crease. Such flattening transforms the circular cross-sectional configuration into an ovate cross-sectional configuration. Or, alternatively, the flattening transforms the circular cross-sectional configuration such that the two halves of the tubular material are vertically stacked.

At the onset of the third stage, the rolled, flattened, and creased tubular material is fed from the reel through a multi-stage packaging machine (i.e., a machine specifically designed and geared for creation of packages, bags, and the like) or multiple individual stage packaging machines. As the packaging machine receives the tubular material, the machine creates a longitudinal seal by simultaneously applying heat and pressure via a heat seal bar. In one embodiment of the present invention, the tubular material is evenly and longitudinally bifurcated by the longitudinal seal such that two independent, identical, interconnected tubes are formed.

Once the tubes are formed via the addition of the longitudinal seal to the flattened and creased tubular material, the packaging machine may be reconfigured to create longitudinal perforations. Thereafter, the tubes are fed into the reconfigured packaging machine, which creates a longitudinal perforation. Alternatively, longitudinal perforations may be created as the second stage of a multi-stage packaging machine. The longitudinal perforation allows the tubes to be easily separated from each other by applying slight pressure on each tube in a direction perpendicular to the centerline such that the tubes are pulled away from each other.

After the longitudinal perforation is created within the longitudinal seal, the packaging machine may be reconfigured to create latitudinal seals. Thereafter, the tubes are fed into the reconfigured packaging machine. The packaging machine forms sequential equally spaced latitudinal seals by simultaneously applying heat and pressure across the latitudinal extents of both of the sleeves. Alternatively, latitudinal seals may be created as the third stage of a multi-stage packaging machine. The equidistant location of each subsequent latitudinal seal creates a plurality of pairs of sleeves having equivalent lengths.

After the latitudinal seals are created, the packaging machine may be reconfigured to create latitudinal perforations. Thereafter, the sleeves are fed through the reconfigured packaging machine. The packaging machine creates latitudinal perforations adjacent to the latitudinal seals such that one pair of sleeves may be separated from a sleeve roll. Alternatively, latitudinal perforations may be created as the fourth stage of a multi-stage packaging machine. The latitudinal perforations also create openings on the end of each of a pair of the sleeves when the pair of sleeves removed from the sleeve roll. These openings allow each of sleeves to be passed over the eyeglass temples.

Once the tubular material has been processed through the first six stages of manufacturing, the processed tubular material may be wound about a reel or cylinder to form a sleeve roll. The resulting sleeve roll has a width equivalent to the width of two sleeves but may have varying diameters depending on the quantity of sleeves rolled thereupon. Once the sleeve roll is processed and wound about the cylinder, the sleeves may be dispensed by attaching the cylinder to any conventionally known holding mechanism sized to fit the sleeve roll. In some embodiments of the present invention, the sleeve roll is suspended within a sleeve dispenser including, but not limited to, those disclosed herein to minimize the space required for display of the sleeves and to facilitate dispensation of the sleeves.

In one aspect of the present invention, the sleeve roll is inserted into the sleeve dispenser through roll apertures contained within the sleeve dispenser. After placing the sleeve roll into the sleeve dispenser, the unrolled end of the processed tubular material is threaded through a dispensing aperture such that it is visible to a user. A lid is then closed over the roll apertures to prevent contamination or displacement of the sleeve roll. Once the sleeve roll is installed in the sleeve dispenser, a user may remove one or more pairs of sleeves by tearing the first available latitudinal perforation. The resulting pair of sleeves may be further separated along the longitudinal perforation and applied to a pair of temples.

In one aspect of the present invention, the base of the sleeve dispenser is designed with a narrow width and length such that the sleeve dispenser can be displayed unobtrusively in a variety of locations. For example, when the sleeve dispenser is used in a hair salon, the streamlined size of the sleeve dispenser allows a dedicated box of sleeves to be placed at each stylist's station, adjacent hairdryers, in spa stations, etc. rather than at one single location within the salon. Such placement allows the customer to access the sleeves without leaving his or her chair and, therefore, without disrupting or delaying the work of the salon employee. This is particularly important when the customer decides to don glasses for reading or the like after the stylist has begun a chemical treatment such as hair coloring, a facial, or the like.

Additionally, the sleeve dispenser may be located in optometrist or ophthalmologist offices or in sunglass shops. By placing the sleeve dispenser in a convenient, visible location, people trying on eyeglasses or sunglasses are encouraged to use the sleeves for hygienic purposes. The use of the sleeves helps prevent the spread of germs and disease by giving the user protection from the previous users. The use of an inexpensive material also allows the sleeves to be discarded after each use. The ability for new sleeves to be used prevents the user from having to remove potentially hazardous chemicals or germs from the sleeves prior to each use.

Furthermore, in some aspects of the present invention, the sleeve dispenser may include an integral or external waste receptacle. Such a receptacle allows the user to discard the used sleeves without having to change his or her physical location, therefore, increasing the likelihood that the user properly disposes of the sleeves. Additionally, a waste receptacle allows chemicals that may have come in contact with the sleeves to be immediately discarded prior to contamination of other surfaces.

BRIEF DESCRIPTION OF THE DRAWINGS

A further understanding of the present invention can be obtained by reference to the embodiments set forth in the illustrations of the accompanying drawings. Although the illustrated embodiments are exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the accompanying drawings in which:

FIG. 2I depicts a top perspective view of the latitudinally heat sealed tubular material depicted in FIGS. 2E-2F after the fifth stage of a manufacturing process in accordance with one embodiment of the present invention including, inter alia, four sleeves separated by a longitudinal seal, longitudinal perforation, and latitudinal seal.

FIG. 2J depicts a top perspective view of the latitudinally perforated tubular material depicted in FIG. 2I after the sixth stage of a manufacturing process in accordance with one embodiment of the present invention including, inter alia, four sleeves separated by a longitudinal seal, longitudinal perforation, latitudinal seal, and latitudinal perforation.

DETAILED DESCRIPTION

Figure 1:
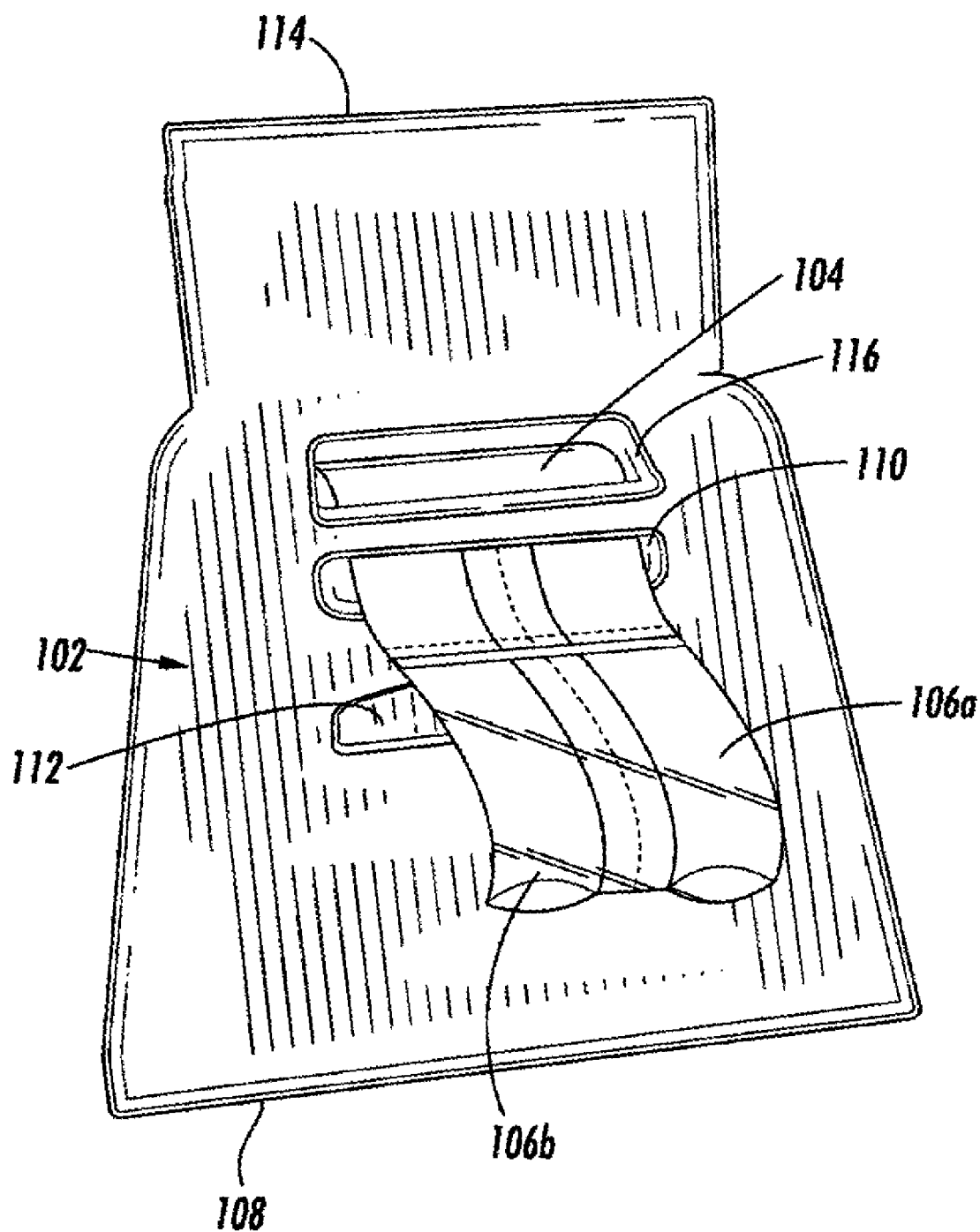
FIG. 1 depicts a perspective view of a sleeve dispenser in accordance with one embodiment of the present invention.

Referring first to FIG. 1, depicted is a high level illustration of one embodiment of sleeve dispenser 100 and sleeves 106a and 106b in accordance with embodiments of the present invention. Sleeve dispenser 100 includes housing 102 and sleeve roll 104. Sleeve roll 104 includes interconnected pairs of sleeves 106a and 106b. Such sleeves may be manufactured in the same manner as sleeves 216a and 216b as described in further detail below with respect to FIG. 2G, however, other methods of manufacturing may be substituted without departing from the scope of the present invention.

In one aspect of the present invention, sleeves 106a and 106b are manufactured from a flexible, chemical-resistant material. For example, in one embodiment of the present invention, sleeves 106a and 106b are manufactured from a polymer such as polyethylene. Use of a polymer such as polyethylene results in clear, soft, flexible, sanitary sleeves 106a and 106b that are resistant to water, acids, alkalies, and a majority of solvents. Also, use of such a material allows sleeves 106a and 106b to be produced inexpensively. The inexpensive cost of sleeves 106a and 106b accommodates throwaway use of the sleeves, thereby facilitating distribution in facilities such as hair salons, spas, optometrist or ophthalmologist offices, sunglass shops, and private homes.

To further reduce the cost of sleeves 106a and 106b, they may be manufactured by a process such as the process described below with respect to FIGS. 2A-2F. In this process, a minimal quantity of steps is required and no waste material is produced, further reducing the cost of sleeves 106a and 106b. During this manufacturing process, sleeves 106a and 106b are placed in the form of a compact roll such as sleeve roll 104 to accommodate unobtrusive placement in areas with limited space.

Figure 2B:
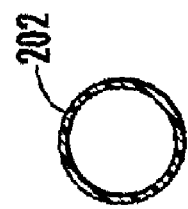
FIG. 2B depicts a cross-sectional side view taken along line 2B-2B of FIG. 2A illustrating the circular nature of the tubular material used to manufacture sleeves such as the sleeves depicted in FIG. 1 in accordance with one embodiment of the present invention.
Figure 2D:
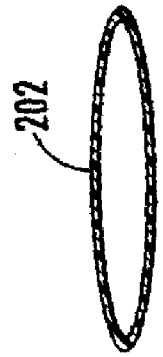
FIG. 2D depicts a cross-sectional side view taken along line 2D-2D of FIG. 2C illustrating the ovate nature of the tubular material after the second stage of a manufacturing process in accordance with one embodiment of the present invention.
Figure 2A:
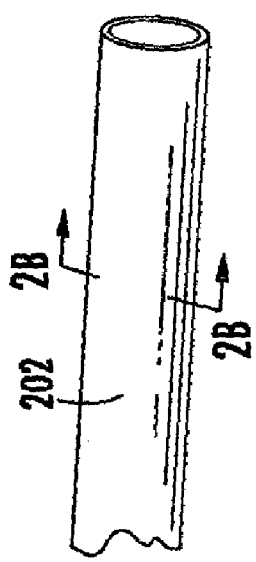
FIG. 2A depicts a front perspective view of the tubular material used to manufacture sleeves such as the sleeves depicted in FIG. 1 in accordance with one embodiment of the present invention.
Figure 2C:
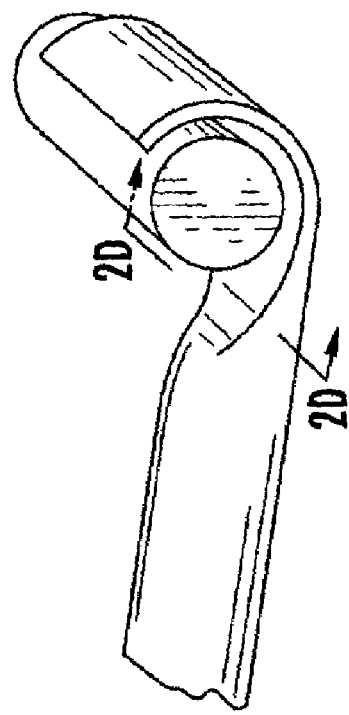
FIG. 2C depicts a front perspective view of the flattening of the tubular material depicted in FIGS. 2A-2B during the second stage of a manufacturing process in accordance with one embodiment of the present invention.
Figure 2F:
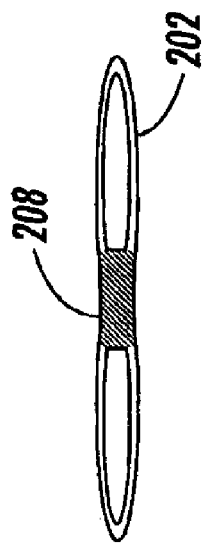
FIG. 2F depicts a cross-sectional side view taken along line 2F-2F of FIG. 2E illustrating the bifurcation of the flattened and longitudinally heat sealed tubular material after the third stage of a manufacturing process in accordance with one embodiment of the present invention.
Figure 2H:
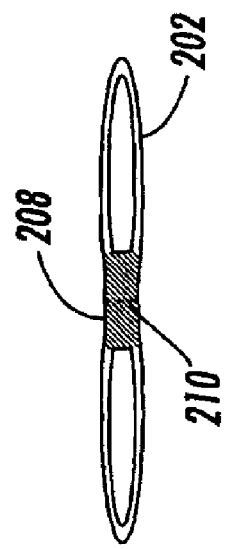
FIG. 2H depicts a cross-sectional side view taken along line 2H-2H of FIG. 2G illustrating the bifurcation of the longitudinally perforated, flattened, and longitudinally heat sealed tubular material after the fourth stage of a manufacturing process in accordance with one embodiment of the present invention.
Figure 2E:
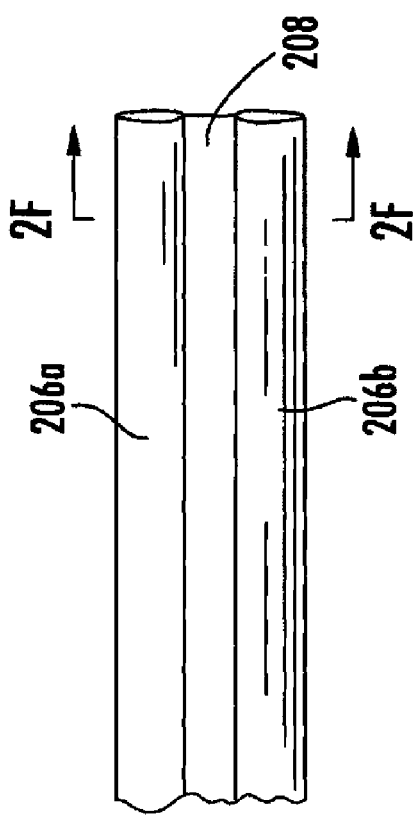
FIG. 2E depicts a top perspective view of the longitudinally heat sealed tubular material depicted in FIGS. 2C-2D after the third stage of a manufacturing process in accordance with one embodiment of the present invention including, inter alia, two tubes separated by a longitudinal seal.
Figure 2G:
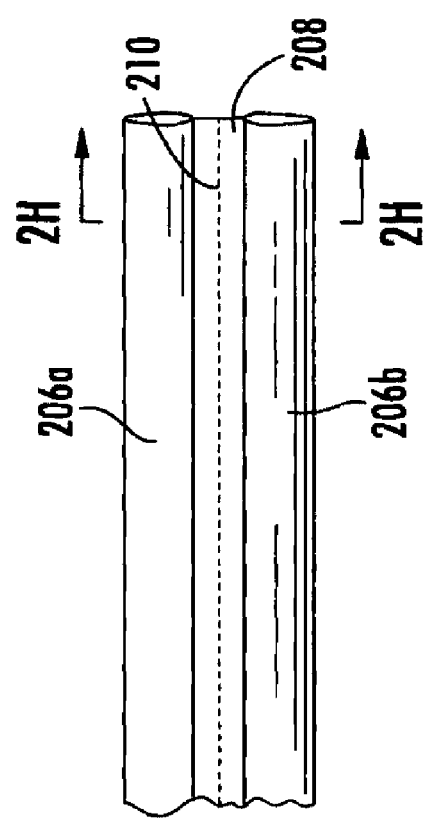
FIG. 2G depicts a top perspective view of the longitudinally perforated tubular material depicted in FIGS. 2E-2F after the fourth stage of a manufacturing process in accordance with one embodiment of the present invention including, inter alia, two tubes separated by a longitudinal seal and longitudinal perforation.
Figure 2L:
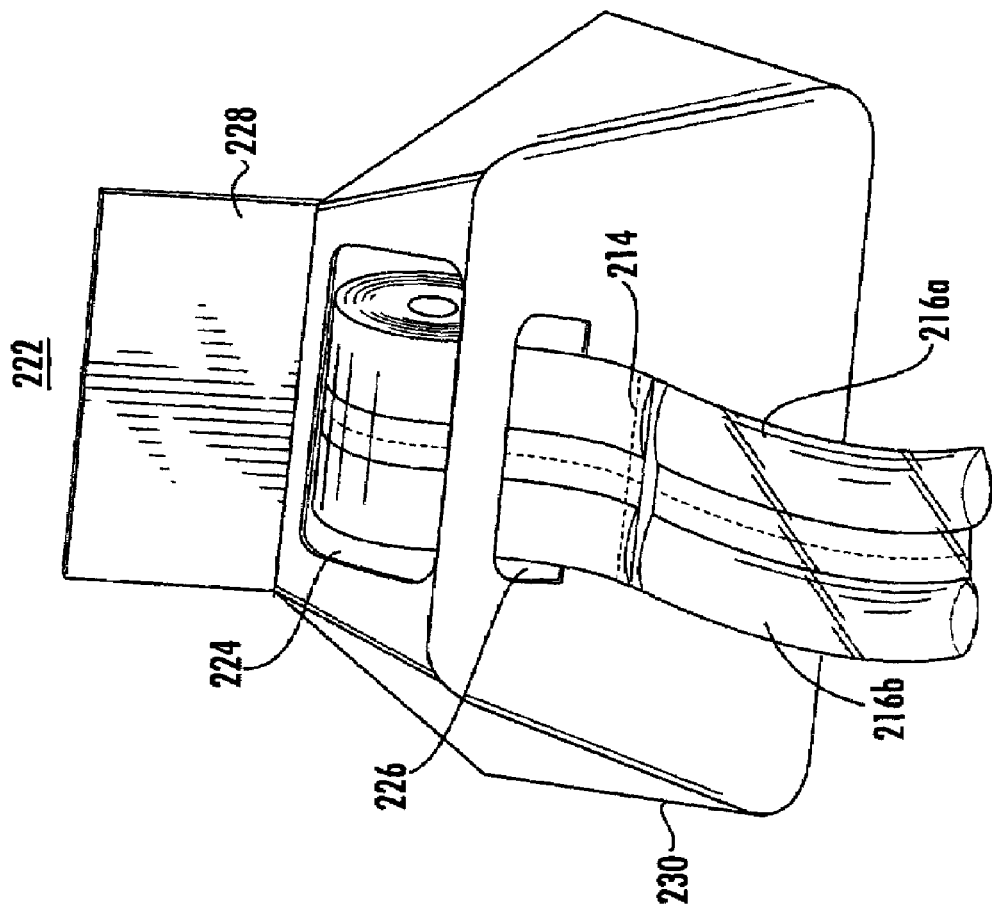
FIG. 2L depicts an angled top perspective view of the rolled tubular material depicted in FIG. 2K suspended in a dispenser after the eighth stage of a manufacturing process in accordance with one embodiment of the present invention.
Figure 2K:
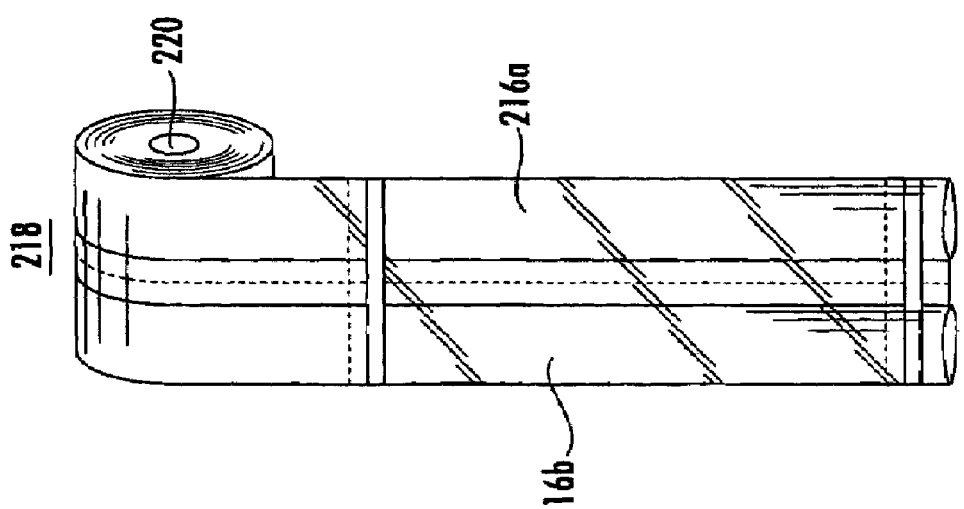
FIG. 2K depicts a front perspective view of rolled tubular material depicted in FIG. 2J after the seventh stage of a manufacturing process in accordance with one embodiment of the present invention including, inter alia, a plurality of sleeves separated by longitudinal seals, longitudinal perforations, latitudinal seals, and latitudinal perforations.
Figure 3A:
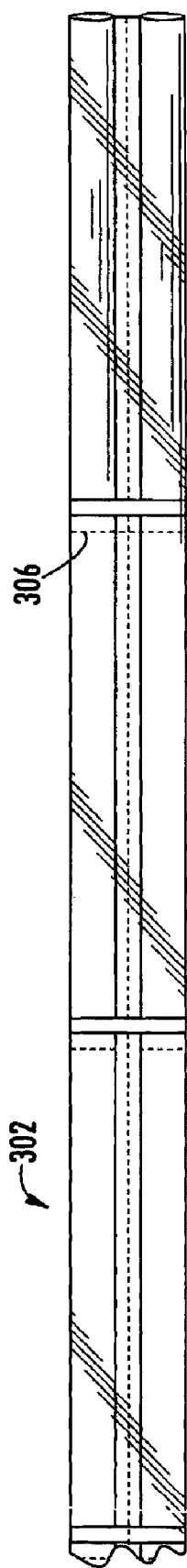
FIG. 3A depicts a top view of three pairs of interconnected sleeves in accordance with one embodiment of the present invention including, inter alia, longitudinal seals, longitudinal perforations, latitudinal seals, and latitudinal perforations.
Figure 3B:
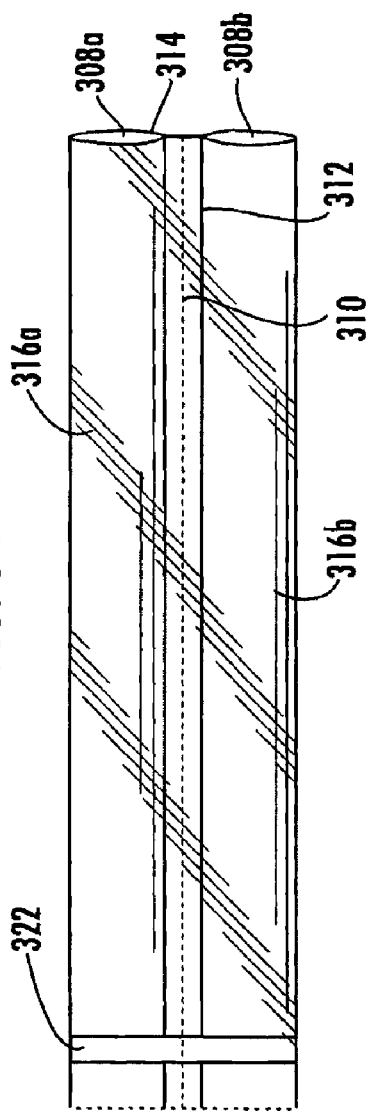
FIG. 3B depicts a top view of one pair of interconnected sleeves in accordance with one embodiment of the present invention including, inter alia, a longitudinal seal, longitudinal perforation, latitudinal seal, and latitudinal perforation.
Figure 3C:
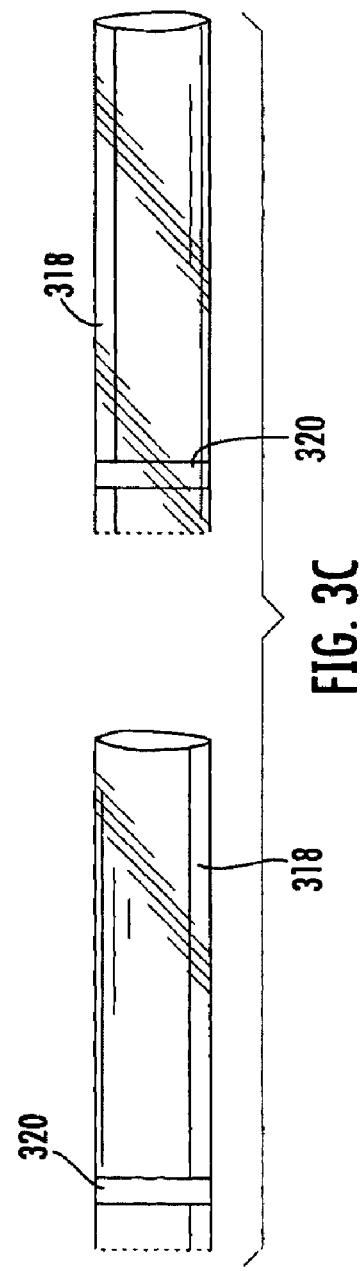
FIG. 3C depicts a top view of one pair of separated sleeves in accordance with one embodiment of the present invention including, inter alia, a longitudinal and latitudinal seal.

Sleeves 106a and 106b include latitudinal and longitudinal perforations such as latitudinal and longitudinal perforations, 214 and 210, respectively, that facilitate removal from sleeve roll 104 and each other as described in further detail with respect to FIGS. 3A-3C. Sleeves 106a and 106b also include a sleeve aperture such as sleeve aperture 308 (FIG. 3), created in the manufacturing process described below with respect to FIG. 2. Upon separation from sleeve roll 104 and each other, sleeves 106a and 106b provide protection for temples, such as eyeglass or sunglass temples, by passing the sleeve aperture over the temple until it is fully protected as described in further detail below with respect to FIG. 4.

Although sleeve roll 104 can be displayed on any conventionally known holding mechanism sized to fit the sleeve roll. In some embodiments of the present invention, sleeve roll 104 is displayed via dispenser 100 to allow sleeves 106a and 106b to be more accessible to the user. Dispenser 100 includes, inter alia, base 108, dispensing aperture 110, lid aperture 112, lid 114, and access aperture 116. Sleeve roll 104 is placed within dispenser 100 via roll apertures such as roll apertures 224 (FIG. 2H). The first pair of sleeves 106a and 106b within sleeve roll 104 is then threaded through dispensing aperture 110 as described with respect to FIG. 2H. Both loading of sleeve roll 104 and threading of sleeve roll 104 through dispensing aperture 110 may be facilitated by using access aperture 116 to grip sleeve roll 104.

Base 108 allows dispenser 100 to be place on any horizontal surface. Additionally, base 108 has a narrow length and width to accommodate placement of dispenser 100 in a location that is accessible to the user but is not obstructive or intrusive to work areas in which dispenser 100 may be placed. For example, dispenser 100 could be placed on a hairdresser's station, next to salon hairdryers, or on spa stations. By placing dispenser 100 in these locations, a person undergoing a chemical treatment such as hair coloring or a facial, could easily obtain sleeves 106a and 106b if they wished to use their eyeglasses while protecting them from the chemicals. Additionally, dispenser 100 could be placed in optometrist or ophthalmologist offices or in sunglass shops. By placing dispenser 100 in a convenient, visible location, people trying on eyeglasses or sunglasses would be encouraged to use sleeves 106a and 106b. The use of sleeves 106a and 106b would prevent the spread of germs and disease by giving the user protection from the contaminants of the previous users. The use of an inexpensive material also allows sleeves 106a and 106b, to be discarded after each use, thereby eliminating messy cleanup such as that encountered with reusable sleeves.

In some embodiments of the present invention, dispenser 100 includes a lid aperture 112 and lid 114. Such items allow sleeve roll 104 to be protected from the environment by closing lid 114 over access and dispensing apertures 116 and 110, respectively, and tucking, or otherwise attaching, lid 114 to an attachment mechanism such as lid aperture 112.

Dispenser 100 may optionally include an integral or external waste receptacle. Such a receptacle allows the user to discard the used sleeves into the integral waste receptacle through a disposal aperture or the like without having to change his or her physical location, therefore, increasing the likelihood that the user properly disposes of sleeves 106a and 106b. Additionally, a waste receptacle allows chemicals that may have come in contact with sleeves 106a and 106b to be immediately discarded prior to contamination of other surfaces.

Turning next to FIGS. 2A-2H, illustrated is one method of manufacturing sleeves such as sleeves 216a and 216b in accordance with one embodiment of the present invention. However, other methods of manufacturing the sleeves of the present invention may be employed without departing from the present scope of the invention.

Referring now to FIG. 2A, illustrated is a perspective front view of tubular material 202 as formed or purchased in the first stage of the manufacturing process. In one aspect of the present invention, tubular material 202 is extruded tubular polyethylene having a circular diameter as depicted in the cross-sectional view shown in FIG. 2B. Polyethylene is an inexpensive polymer that may be extruded via methods such as the application of high temperature and pressure. The use of a moldable polymer such as polyethylene also allows sleeves 216a and 216b to be formed without byproducts, which eliminates waste of raw materials and reduces the expense associated with the first stage of the manufacturing process.

In one aspect of the present invention, tubular material 202 is manufactured to have a wall thickness of two thousandths of an inch and a diameter of approximately eight tenths of one inch. However, varying dimensions can be used without departing from the scope of the present invention, providing that the dimensions accommodate the dimensions of standard eyeglass temples. The length of tubular material 202 is selected based upon the quantity of desired sleeves, which may be selected based upon a quantity of factors. In one aspect of the present invention, the quantity of desired sleeves is selected to minimize the size of a sleeve dispenser such as sleeve dispenser 100 to accommodate use in tight spaces (e.g., a hair stylist's counter or rolling cart, a display counter in an ophthalmologist's office, etc.). In another aspect of the present invention, a small quantity of sleeves (e.g., 30 pairs) may be manufactured for dispensers sold for home use, whereas larger quantities of sleeves (e.g., 80 pairs) may be manufactured for dispensers sold for commercial use (e.g., hair salons). These quantities may be determined based upon factors such as the length of tubular material 202.

Turning next to FIG. 2C, illustrated is a front perspective view of the flattening and creasing of tubular material 202 as it occurs during the second stage of the manufacturing process. After tubular material 202 has been extruded and cooled, the manufacturing process proceeds to the second stage in which tubular material 202 is wound onto reel 204. The winding of tubular material 202 onto reel 204 causes tubular material 202 to flatten and crease. Such flattening transforms the circular cross-sectional configuration into an ovate cross-sectional configuration as depicted in FIG. 2D. In addition to providing a mechanism for flattening and creasing tubular material 202, reel 204 also facilitates storage of tubular material 202 in a manner suitable to the next (i.e., the third) stage of manufacturing. For example, storage of the flattened and creased tubular material 202 on reel 204 may be employed to ensure that tubular material 202 is fed evenly into a packaging machine as described below with respect to FIG. 2E.

Referring next to FIG. 2E, illustrated is a top perspective view of tubular material 202 bifurcated with longitudinal seal 208 as produced in the third stage of the manufacturing process in accordance with one embodiment of the present invention. At the onset of this stage, rolled, flattened and creased tubular material 202 is fed from reel 204 through a packaging machine. In one aspect of the present invention, the packaging machine is a Kwik-Pak packaging machine, however, other similar machines may be substituted without departing from the scope of the present invention. As the packaging machine receives tubular material 202, the machine first creates longitudinal seal 208 by simultaneously applying heat and pressure via a heat seal bar. In the embodiment of the present invention depicted in FIGS. 2E-2F, longitudinal seal 208 evenly and longitudinally bifurcates tubular material 202 such that two independent, identical, interconnected tubes 206a and 206b are formed, a cross section of which is depicted in FIG. 2F. In the depicted embodiment, each resulting tube 206a and 206b has a width of one half of one inch and longitudinal seal 208 has a width of one quarter of one inch. However, alternate embodiments are envisioned having varying longitudinal seal widths, varying longitudinal seal locations (e.g., off center), and/or varying tube widths without departing from the scope of the present invention.

Turning now to FIG. 2G, illustrated is a top perspective view of tubular material 202 bifurcated with longitudinal seal 208 and longitudinal perforation 210 as produced in the fourth stage of the manufacturing process in accordance with one embodiment of the present invention. Once tubes 206a and 206b are formed via the addition of longitudinal seal 208 to flattened and creased tubular material 202, the second stage of the packaging machine creates longitudinal perforations. Longitudinal perforation 210 is a series of intermittent slits located approximately at the centerline of longitudinal seal 208. FIG. 2H provides a cross-sectional view of the product that results from this stage of manufacturing. Longitudinal perforation 210 allows tubes 206a and 206b to be easily separated from each other by applying slight pressure on each tube in a direction perpendicular to the centerline such that the tubes are pulled away from each other, as described below in greater detail with respect to FIG. 3. Although longitudinal perforation 210 is depicted in FIG. 2G along the centerline of longitudinal seal 208, alternate embodiments are envisioned having varying longitudinal perforation locations (e.g., off center) and/or varying perforation widths without departing from the scope of the present invention. However, the thickness of longitudinal seal 208 must be great enough to ensure that the outer walls of each tube 206a and 206b will remain contiguous and intact after separation of tubes via longitudinal perforation 210. Furthermore, although longitudinal seals and perforations are discussed herein as two different steps, a packaging machine fitted with a custom heat seal bar having perforation capabilities may be substituted to reduce these two steps to one step.

Referring now to FIG. 2I, illustrated is a top perspective view of latitudinally heat sealed tubular material 202 as produced in the fifth stage of a manufacturing process in accordance with one embodiment of the present invention. After longitudinal perforation 210 is created within longitudinal seal 208, the third stage of the packaging machine creates latitudinal seals. The packaging machine forms sequential, equally spaced latitudinal seals 212 by simultaneously applying heat and pressure across the latitudinal extents of both tubes 206a and 206b. The equidistant location of each subsequent latitudinal seal 212 creates a plurality of pairs of sleeves 216a and 216b having equivalent lengths. In one embodiment of the present invention, each latitudinal seal 212 is located five and one half inches from the previous latitudinal seal 212 such that each resulting pair of sleeves 216a and 216b has a length of five and one half inches. However, alternate embodiments are envisioned having varying lengths separating adjacent latitudinal seals 212 without departing from the scope of the present invention.

Turning now to FIG. 2J, illustrated is a top perspective view of latitudinally heat-sealed and perforated tubular material 202 as produced in the sixth stage of a manufacturing process in accordance with one embodiment of the present invention. After latitudinal seals 212 are created, the fourth stage of the packaging machine creates latitudinal perforations. The packaging machine creates latitudinal perforations 214 adjacent to latitudinal seals 212 such that one pair of sleeves 216a and 216b may be separated from sleeve roll 218, as described below with respect to FIG. 2K. Latitudinal perforations 214 also create openings on the end of each of a pair of sleeves 232a and 232b when the pair of sleeves 216a and 216b is removed from a roll such as sleeve roll 218 (FIG. 2K). These openings allow each of sleeves 232a and 232b to be passed over eyeglass temples 402 as discussed below with respect to FIG. 4. Furthermore, although latitudinal seals and perforations are discussed herein as two different steps, a packaging machine fitted with a custom heat seal bar having perforation capabilities may be substituted to reduce these two steps to one step. Or, alternatively, a packaging machine fitted with a custom heat seal bar having latitudinal and longitudinal perforation and sealing capabilities may be substituted to reduce these four steps to one step.

Turning next to FIG. 2K, illustrated is a front perspective view of rolled tubular material depicted in FIG. 2J after the seventh stage of a manufacturing process in accordance with one embodiment of the present invention. Once tubular material 202 has been processed through the first six stages of manufacturing, the processed tubular material 202 may be wound about a reel or cylinder such as cylinder 220 to form sleeve roll 218. The resulting sleeve roll 218 has a width equivalent to the width of a pair of sleeves 216a and 216b but may have varying diameters depending on the quantity of sleeves 216a and 216b rolled thereupon. In one embodiment of the present invention, the initial length of tubular material 202 determines the diameter of sleeve roll 218. After the entire length of tubular material 202 is processed, tubular material 202 is wound onto a cylinder such as cylinder 220 until the entire length of tubular material 202 encircles cylinder 220. In this scenario, the resulting width of sleeve roll 218 is directly related to the original length of tubular material 202. Alternatively, processed tubular material 202 could have a very long length relative to the length of processed tubular material 202 wound about cylinder 220. In this scenario, processed tubular material would be wound about cylinder 220 until the desired diameter of sleeve roll 218 is obtained. At this point, the wound tubular material 202 is detached from the unwound tubular material 202 via a latitudinal perforation such as latitudinal perforation 214.

Referring now to FIG. 2L, illustrated is an angled top perspective view of sleeve roll 218 (FIG. 2K) suspended in sleeve dispenser 222 housing after the eighth stage of a manufacturing process in accordance with one embodiment of the present invention. In the depicted embodiment, sleeve dispenser 222 includes, inter alia, base 230, roll aperture 224, dispensing aperture 226, and lid 228. Once sleeve roll 218 is processed and wound about cylinder 220, sleeves 216a and 216b may be dispensed by attaching cylinder 220 to any conventionally known holding mechanism. However, in the embodiment of the present invention depicted in FIG. 2L, sleeve roll 218 is suspended within a dispenser such as sleeve dispenser 222 to minimize the space required for display of sleeves 216a and 216b and to facilitate dispensation of sleeves 216a and 216b.

Sleeve roll 218 is inserted into sleeve dispenser 222 through an aperture such as roll aperture 224. Thereafter, sleeve roll 218 is suspended within dispenser 222 using any one of a variety of methods (e.g., sleeve roll 218 is placed atop a shelf located internal to dispenser 222, inserting a spring-loaded sleeve roll 218 into apertures located in the sides of dispenser 222, etc.). After placing sleeve roll 218 into sleeve dispenser 222, the unrolled end of processed tubular material 202 is threaded through dispensing aperture 226 such that it is visible to a user. Lid 228 is then closed to prevent contamination or displacement of sleeve roll 218. Once sleeve roll 218 is installed in sleeve dispenser 222, a user may remove one or more pairs of sleeves 216a and 216b by tearing the first available latitudinal perforation 214. The resulting pair of sleeves 216a and 216b may be further separated along longitudinal perforation 210 and applied to a pair of temples as described in further detail below with respect to FIGS. 3-4.

Sleeve dispenser 222 also includes base 230. In one aspect of the present invention, base 230 is designed with a narrow width and length such that sleeve dispenser 222 can be displayed unobtrusively in a variety of locations. For example, when sleeve dispenser 222 is used in a hair salon, the streamlined size of sleeve dispenser 222 allows a dedicated box of sleeves 216a and 216b to be placed at each stylist's station, individual hairdryers, in spa stations, etc. rather than at one single location within the salon. Such placement allows the customer to access sleeves 216a and 216b without leaving his or her chair and, therefore, without disrupting or delaying the work of the salon employee. This is particularly important when the customer decides to don glasses for reading or a similar action after the stylist has begun a chemical treatment such as hair coloring, a facial, or the like.

Additionally, sleeve dispenser 222 may be located in optometrist or ophthalmologist offices or in sunglass shops. By placing sleeve dispenser 222 in a convenient, visible location, people trying on eyeglasses or sunglasses are encouraged to use sleeves 216a and 216b for hygienic purposes. The use of sleeves such as sleeves 216a and 216b helps prevent the spread of germs and disease by giving the user protection from the previous users.

Although the method of manufacturing depicted in FIGS. 2A-2L include eight steps, any quantity of steps may be performed without departing from the scope of the present invention. For example, some steps may be eliminated (e.g., the sleeve roll may not be housed in a dispenser, the sleeves may be not be perforated causing the wearer to manually cut them with a scissor, etc.). Or, some steps may be combined. For example, individual packaging machines may be used to individually create the latitudinal and longitudinal seals and/or perforations rather than reconfiguring a single packaging machine, or incorporating multiple packaging machines, for each of these actions. In yet another alternate embodiment, steps or stages may be added to those disclosed herein (e.g., application of color or trademarks to the dispenser, application of markings to the sleeves, etc.) without departing from the scope of the present invention.

Referring next to FIG. 3A, illustrated is a top perspective view of a length of sleeve roll 302, such as sleeve roll 218 (FIG. 2K), in accordance with one embodiment of the present invention including three interconnected pairs of sleeves 304a-304c. When a user requires a pair of sleeves 304, the endmost pair of sleeves 304c is removed from sleeve roll 302 by applying pressure to latitudinal perforation 306 located between endmost sleeve 304c and adjacent sleeve 304b. By severing latitudinal perforation 306, pair of sleeves 304c is separated from sleeve roll 302 while simultaneously creating sleeve apertures such as sleeve apertures 308a and 308b (FIG. 3B) in pair of sleeves 304b, which remains attached to sleeve roll 302.

Turning now to FIG. 3B, illustrated is pair of sleeves 304c after removal from sleeve roll 302 including sleeve apertures 308a and 308b, latitudinal perforations 306 and 314, latitudinal seal 322, longitudinal perforation 310, and longitudinal seal 312 in accordance with one embodiment of the present invention. Longitudinal perforation 310 allows sleeves 316a and 316b to be easily separated from each other by applying slight pressure on each sleeve 316 in a direction perpendicular to the centerline such that the sleeves are pulled away from each other, thereby severing longitudinal perforation 310.

Sleeve apertures 308 are created within pair of sleeves 304c by severing latitudinal perforation 314 (e.g., to remove an adjacent pair of sleeves from pair of sleeves 304c). Sleeve apertures 308 allow each sleeve 316a and 316b of pair of sleeves 304c to be passed over each of a pair of temples as depicted in FIG. 4. The location of latitudinal perforations such as latitudinal perforation 306 relative to adjacent latitudinal seals such as latitudinal seal 322 is designed such that tearing of latitudinal perforation 306 does not disrupt or alter the integrity of latitudinal seal 322. Such seals must remain intact to prevent contact of the temples with any chemicals, germs, bacteria, and the like that may be present on or external to sleeves 316.

Referring now to FIG. 3C, illustrated are sleeves 316a and 316b after separation from each other in accordance with one embodiment of the present invention. Upon such separation, each sleeve 316a and 316b contains longitudinal seals 318 that are segments of longitudinal seal 312. In one aspect of the present invention, longitudinal seals 318 have equivalent widths, each having a value of one half the width of longitudinal seal 312. Longitudinal seals 318 reinforce the strength of each sleeve 316 and help maintain their flat or ovate cross-sectional configurations. Each sleeve 316 also includes latitudinal seals 320. In some embodiments, latitudinal seals 320 are one half of the length of latitudinal seal 322. Longitudinal and latitudinal seals, 318 and 320, respectively, along with sleeve apertures 308 create a pocket within each sleeve 316 into which each temple of a pair of temples may be inserted for protection from its environment.

As depicted in FIGS. 2A-3C, the entirety of tubular material 202 is consumed by sleeves 216a and 216b. That is, no waste is produced during creation of sleeves 216a and 216b or separation of sleeves 216a and 216b from sleeve roll 218 or each other. This is an important aspect of the depicted embodiment of the present invention because it allows sleeves 216a and 216b to be produced inexpensively by minimizing the required quantity of raw material.

Figure 4A:
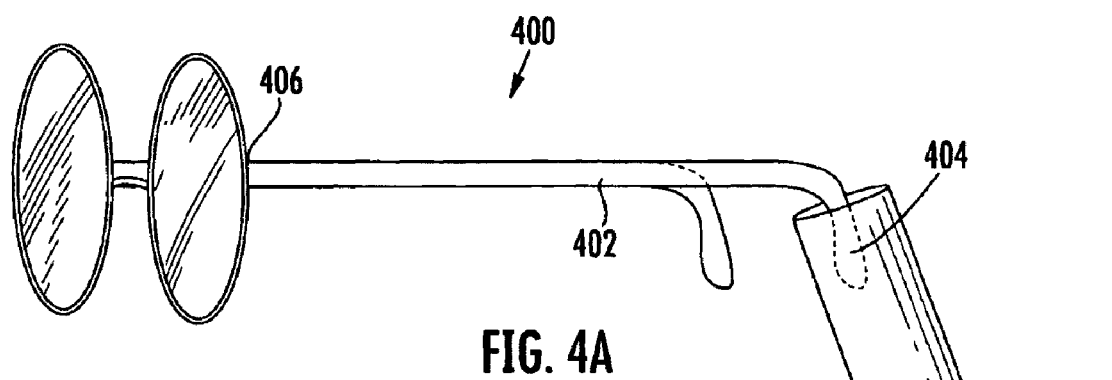
FIG. 4A depicts a side view of eyeglasses in accordance with one embodiment of the present invention including, inter alia, temple, temple end, and brow onto which a sleeve is being placed.
Figure 4B:
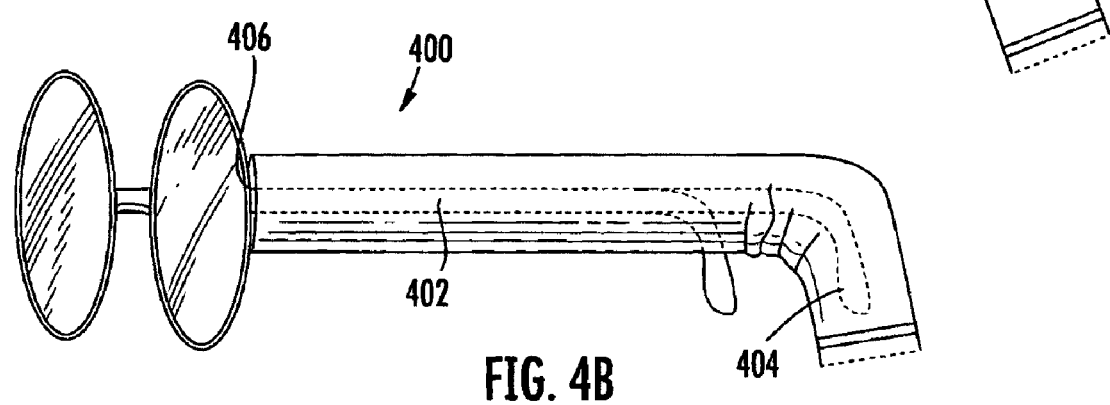
FIG. 4B depicts a side view of eyeglasses in accordance with one embodiment of the present invention including, inter alia, temple, temple end, brow, and sleeve.

Turning now to FIG. 4A, illustrated is a side view of eyeglasses 400 including, inter alia, temple 402, temple end 404, and eyeglass bow 406 in accordance with one embodiment of the present invention. A sleeve such as sleeve 316a is placed on eyeglasses 400 by passing the sleeve aperture such as sleeve aperture 308*a* over temple end 402. After sleeve aperture 308*a* is passed over temple end 402, sleeve 316*a* is slid over the entire length of temple 402 such that sleeve aperture 308*a* is flush with eyeglass bow 406 and latitudinal seal 320*a* contacts temple end 402 as depicted in FIG. 4B. Since the lengths of temple 402 may vary between eyeglasses, sleeve 316*a* is manufactured with a length that will accommodate the length of any conventional temple. In shorter temples, this may cause sleeve 316*a* to overlap slightly, however, this will not prevent or decrease the level of protection provided for the temples. Although the embodiment depicted in FIGS. 4A-4B include eyeglasses, sunglasses or other types of glasses may be substituted without departing from the scope of the present invention.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that techniques, systems and operating structures in accordance with the present invention may be embodied in a wide variety of forms and modes, some of which may be quite different from those in the disclosed embodiments, without departing from the spirit and the principles of the invention.

The invention claimed is:

1. A method of protecting a temple, comprising the steps of:

removing a pair of sleeves from a sleeve dispenser, wherein said sleeves are dispensed from a roll;

separating the sleeves along an longitudinal perforation, said sleeves having a sleeve aperture;

passing each sleeve aperture over a temple end and sliding the sleeve over the lengths of the temple;

wherein the sleeve is formed from a length of tubing including at least one longitudinal seal, at least one longitudinal perforation, at least one latitudinal seal, and at least one latitudinal perforation.

\* \* \* \* \*